UNITED STATES PATENT OFFICE.

JOHN HOPKINSON, OF BRADFORD, ENGLAND.

PROCESS OF TREATING WOOL-FAT.

SPECIFICATION forming part of Letters Patent No. 649,454, dated May 15, 1900.

Application filed December 28, 1897. Serial No. 664,089. (No specimens.)

*To all whom it may concern:*

Be it known that I, JOHN HOPKINSON, a subject of the Queen of Great Britain, residing at Bradford, in the county of York, England, have invented certain new and useful Improvements in the Treatment of Wool-Grease and Soapsuds, of which the following is a specification.

This invention is applicable to the brown grease which is obtained from the washing or the back-washing of wool by treating the soapsuds with acid or to the grease obtained direct from wool by solvents or, in fact, to almost any other greases containing unsaponifiable matter. Now by my invention I obtain the lanolin or the grease from which it is made in great purity. I obtain also an extremely-viscous oil consisting entirely of neutral fat, which is a remarkably-good lubricant for heavy machinery, and I further obtain a very pure form of soap.

I partially saponify the raw grease by adding to one hundred pounds of grease eighteen and one-half pounds of caustic-soda solution (specific gravity 1.250) or equivalent quantity of caustic potash of specific gravity about 1.250 and boil the mixture until the alkali is absorbed. The amount of alkali required for this purpose is preferably about fifty per cent. of that actually necessary to fully saponify the saponifiable fats in the grease. As this amount differs with different greases and with the wool-fat from different climates, it is impossible to give exact quantities; but the quantity required to fully saponify it can be easily found by experiments or analysis of a small portion of each batch. The mixture is boiled until the alkali is absorbed. I add sufficient chlorid of sodium or other soda salt in solution as will precipitate the unsaponified fat. The exact amount of chlorid of sodium can only be found with each given variety of fat by experiment, but approximately fourteen pounds of salt in solution to one hundred pounds of fat operated on. The mixture is allowed to repose for a few hours. The unsaponified fat rises and forms a superstratum of anhydrous lanolin. The substratum is a mixture of soap and fat-alcohols in solution. The superstratum is removed, and to the substratum is added ethyl or methyl alcohol or methylated spirit in the proportion of about three and a half times the original bulk of grease operated upon, the methylated spirits being, preferably, of specific gravity .950. The object of adding ethyl or methyl alcohol is to obtain a complete separation of the constituents of wool-grease; but this can only be done in conjunction with saponification and the addition of benzol or other solvent insoluble in alcohol. It is utterly impossible to completely separate neutral fat and soap by the application of alkalies in aqueous solution, either in a state of hydrate or carbonate, the fat from the apparently-separated soap having about the same composition as the mixed fat which floats on the top. I now add a solvent of fat-alcohols, preferably coal-tar benzol, which does not dissolve soap, but only dissolves the fat-alcohols when the soap is dissolved in methylated spirits or ethyl alcohol of the strength and quantity named—namely, specific gravity .950 and three and one-half times the weight of the original grease. This coal-tar benzol is added a little at a time and thoroughly stirred up, the fat-alcohols and benzol rise to the surface and are skimmed off, and the solvent separated by distillation. The fat-alcohols thus obtained are an excellent lubricant. The soap solution is finished in the usual well-known way of soap-boilers and is then ready for either household or manufacturing purposes.

Where it is not requisite to obtain the lanolin and fatty alcohols in separate form, the process can be simplified by completely saponifying at start—say by adding about thirty pounds of solution of caustic soda (specific gravity 1.250) or an equivalent amount of caustic potash to one hundred pounds of grease; but the exact amount is ascertained by an analysis of each batch. The ethyl or methyl alcohol or methylated spirits is added and the mixture is submitted to a pressure of two atmospheres until saponification is complete. After cooling down to about 180° Fahrenheit the coal-tar benzol is added, as before. This dissolves the fat-alcohols, cholesterin, and isocholesterin, leaving the soap, however, with the methylated spirits as a lower stratum. After standing for a time the upper layer is drawn or skimmed off and, if necessary, further benzol added to the lower layer and again skimmed off till all the unsaponifiable matter is withdrawn from the soap. Each of the two liquors is distilled to separate the solvent, as before. The upper layer produces a mixture of the raw lanolin and fatty alcohols, forming an admirable lubricant of extraordinary viscosity, and the lower layer a capital soap for household or manufacturing purposes. It is obvious that if the entire process first described were carried out and the raw lanolin and the fatty alcohols added together instead of being kept separate the results and the chemistry of the two processes would be identical.

I declare that what I claim is—

1. The herein-described process of treating wool-fat consisting in partially saponifying the same, separating out the saponified fat and lower fat-alcohols, adding to these while in a heated state a solution of caustic alkali, ethyl or methyl alcohol, and coal-tar benzol, separating the respective layers, and distilling these latter, substantially as described.

2. The herein-described process of treating wool-fat which consists in partially saponifying the same, separating out the saponified fat and lower fat-alcohols, treating such separated products with a solution of caustic alkali, ethyl or methyl alcohol and coal-tar benzol, separating the resulting products into two parts, one consisting of benzol and the other of alcohol, soap and combined lye and glycerin, separating the combined lye and glycerin from the alcohol and soap in the ordinary manner, one part consisting of benzol and the unsaponifiable materials and the other part consisting of alcohol and soap separately whereby an excellent lubricant and a valuable soap are obtained, substantially as described.

3. The herein-described process of treating wool-fat consisting in partially saponifying the same, separating out the saponified fat and lower fat-alcohols, treating said fat and alcohols with a solution of caustic alkali, precipitating the unsaponified fat by means of salt, adding ethyl or methyl alcohol and coal-tar benzol, separating the product into two parts, one consisting of benzol and fat-alcohols and the other of alcohol and soap and distilling each product separately whereby lanolin, the lower fat-alcohols as a lubricant, and a valuable soap are obtained, substantially as described.

4. The process of treating wool-fat which consists in partially saponifying the same, separating the resulting product into two parts, one consisting of unsaponified fat and the other of saponified fat and the lower fat-alcohols, then subjecting this latter product to the action of ethyl or methyl alcohol in conjunction with coal-tar benzol whereby the soap and lower fat-alcohol are separated, substantially as described.

In testimony whereof I have signed my name to this specification in the presence of two subscribing witnesses.

JOHN HOPKINSON.

Witnesses:
GEORGE SPEIGHT,
W. P. THOMPSON.